United States Patent [19]

Wu et al.

[11] Patent Number: 4,989,956
[45] Date of Patent: Feb. 5, 1991

[54] VISUAL DISPLAY DEVICE WITH FLUORESCENT DYE-DOPED EDGE-ILLUMINATING EMITTER PANEL

[75] Inventors: Wei-Yu Wu, Calabasas; Tsung Y. Hsu, Thousand Oaks; Anna M. Lackner, Los Angeles; Willis H. Smith, Jr., Newbury Park, all of Calif.

[73] Assignee: Hughes Aircraft Company, Los Angeles, Calif.

[21] Appl. No.: 293,875

[22] Filed: Jan. 4, 1989

[51] Int. Cl.$^5$ .............................. G02F 1/13
[52] U.S. Cl. ........................ 350/345; 90/546
[58] Field of Search ............... 350/3.7, 3.85, 345, 350/331 R, 350 F; 354/53; 40/546

[56] References Cited

U.S. PATENT DOCUMENTS

| | | | |
|---|---|---|---|
| 4,165,930 | 8/1979 | Matsumoto | 354/53 |
| 4,285,889 | 8/1981 | Parsons | 40/546 |
| 4,688,900 | 8/1987 | Doane et al. | 350/347 |
| 4,697,365 | 10/1987 | Moosbrugger et al. | 40/546 |
| 4,703,572 | 11/1987 | Chapin | 250/461.1 |
| 4,728,547 | 3/1988 | Vaz et al. | 428/1 |
| 4,838,661 | 6/1989 | McKee | 350/345 |
| 4,892,369 | 1/1990 | Moss | 350/3.7 |

FOREIGN PATENT DOCUMENTS

| | | |
|---|---|---|
| 2552278 | 5/1977 | Fed. Rep. of Germany . |
| 3120601 | 12/1982 | Fed. Rep. of Germany . |
| 8805002 | 7/1988 | PCT Int'l Appl. . |
| 0948379 | 2/1964 | United Kingdom . |
| 2085568 | 4/1982 | United Kingdom . |

OTHER PUBLICATIONS

G. Baur et al., "Fluorescence-Activated Liquid-Crystal Display", Applied Physics Letters, vol. 31, No. 1, Jul. 1, 1977, pp. 4–6.
S. Sato et al., "Multicolor Fluorescent Display by Scattering States in Liquid Crystals", J. Appl. Phys. 52(6), 1981, pp. 3941–3948.
A. Goetzberger et al., "Solar Energy Conversion with Fluorescent Collectors", Applied Physics 14, 1977, pp. 123–139.
"A Little Light Goes a Long Way with Lisa", Mobay Corp. Marketing Document.
"Light-Collecting Plastics-A Brilliant Idea", Provisional Information Sheet, Mobay Corp.
Steven Ashley, "Razzle-Dazzle Plastic", Popular Science, pp. 100–101.
Applied Physics Letters, vol. 31, No. 1, Jul. 1, 1977, (American Institute of Physics), G. Baur et al., "Fluorescence-Activated Liquid-Crystal Display", pp. 4–6.

Primary Examiner—Bruce Y. Arnold
Assistant Examiner—J. P. Ryan
Attorney, Agent, or Firm—V. D. Duraiswamy; P. M. Coble; W. K. Denson-Low

[57] ABSTRACT

A light emitting panel is formed of a transparent plastic substrate doped with fluorescent dye which absorbs incident light through a relatively large surface area and emits light of a longer wavelength out through one edge. The incident light may be ambient or produced by a fluorescent light source. The edge emitted light is optically coupled into an edge of a display panel, which may be a polymer dispersed liquid crystal display or a plastic panel having a display surface formed with an etched or printed pattern, grating or hologram. The substrate materials of the emitting and display panels, as well as an optical adhesive which joins the edges thereof, preferably have an essentially similar index of refraction which is larger than that of air causing light propagating through the panels to be internally reflected and exit the structure only through the pattern on the display surface. The display panel is preferably transparent in the absence of light incident on the emitting panel, and produces a display visible from only one direction upon application of incident light. The display panel may be constituted as a center-high-mounted stop light for an automotive vehicle.

48 Claims, 4 Drawing Sheets

VISUAL DISPLAY DEVICE WITH FLUORESCENT DYE-DOPED EDGE-ILLUMINATING EMITTER PANEL

BACKGROUND OF THE INVENTION

1. Field of the Invention

The present invention generally relates to visual display panels, and more specifically to a novel and unique combination of a fluorescent dye-doped edge-illuminating emitter panel with such a visual display panel.

2. Description of the Related Art

Visual display panels such as liquid crystal displays (LCD), direct view dashboard displays, virtual image displays, aviation heads-up displays (HUD) on partial reflectors or holographs and automotive center-high-mounted stop light displays are becoming increasing popular in many applications in varied technical fields. In combination with the development of these display panels comes an increasing requirement to reduce their profile both in size and the visibility of the light source and other elements which do not form the actual display pattern. Further, it is desirable to reduce the power requirements for the display panel illumination sources.

In particular, red colored, center-high-mounted stoplight devices (CHMSL) for automotive vehicles are becoming increasingly popular due to the increased safety margin they provide. In addition to the conventional right and left mounted, red-colored rear brake lights, newer vehicles and retrofit packages for older vehicles are available which include the center-high-mounted stoplight device in the form of a third brake light which is mounted near the top of the vehicle rear window. Depression of the vehicle brake pedal causes the center-high-mounted stoplight device to be illuminated in combination with the two low mounted brake lights to form a triangle pattern with enhanced visibility and ability to attract the attention of the operator of a trailing vehicle. Experience indicates that the center-high-mounted stoplight devices have prevented traffic accidents in situations requiring emergency braking under high speed, congested traffic conditions.

Existing center-high-mounted stoplight devices generally use an opaque housing with a rear-facing translucent red panel, and with an illuminating bulb inside the housing wired to the vehicle's brake circuit. The opaque housing itself constitutes a safety hazard in that it blocks a portion of the view out the rear window which the vehicle operator must see via the rear-view mirror. An opaque housing, or at least a light blocking member behind the illuminating bulb and red panel, is necessary to prevent the vehicle operator from confusing the center-high-mounted stoplight display with a light from a trailing vehicle.

Another category of display is the liquid crystal display (LCD), which has become popular in clocks and other analog and digital readout applications. These are essentially passive devices which require external illumination. Liquid crystal displays are generally transparent panels with imbedded segment or other patterns formed from a material which is normally transparent in the absence of an applied electric field, and which becomes opaque upon application of an electric field, or vice-versa. A liquid crystal display may be utilized in a transmission mode with illumination from the rear, or in a reflection mode with illumination from the front. Both modes are highly affected by ambient light which swamps the generally weak applied illumination, resulting in low visibility and contrast.

SUMMARY OF THE INVENTION

In accordance with the present invention, the drawbacks of the related art are overcome by combining a light emitting or illuminating panel with a display panel, and edge coupling light from the emitter panel into the display panel in coordination with the indices of refraction and total internal reflection angles of the panels. The light emitting panel is formed from a transparent plastic substrate doped with a fluorescent dye which absorbs incident light through a relatively large surface area and emits light of a longer wavelength through the edges. The incident light may be either ambient or produced by a fluorescent light source. The edge emitted light is optically coupled into an edge of a display panel, which may be a polymer dispersed liquid crystal display or a plastic panel having a display surface formed with an etched or printed pattern, grating or hologram.

The substrate materials of the emitting and display panels, as well as an optical adhesive which joins the edges thereof, preferably have an essentially similar index of refraction which is larger than that of air. Light propagating through the panels is thus internally reflected, and exits the structure only through the pattern on the display surface. The display panel is preferably transparent in the absence of light incident on the emitting panel, and produces a display visible from only one direction upon application of incident light. The display panel may be a center-high-mounted stop light for an automotive vehicle.

It is a purpose of the present invention to provide an automotive center-high-mounted stop light, polymer dispersed liquid crystal, or holographic visual display device with a fluorescent dye-doped edge-illuminating emitter panel which combines the component elements thereof in a novel and heretofore unknown manner.

Another purpose of the present invention is to provide a visual display device which may preferably be configured as a center-high-mounted stoplight having a display panel which is transparent in both directions in the absence of illuminating light. Upon illumination of an associated linear edge coupling emitter panel, the display panel remains transparent in one direction and provides a high intensity visual output in the opposite direction.

Another purpose is to provide a visual display device which is capable of operating either with or without the addition of an auxiliary light source, and which is self-regulating in intensity in response to the ambient light level.

Another purpose is to provide a visual display device which is simple in structure, employing a luminescence plastic sheet as an emitter panel and a visual display or light output coupling panel on the same substrate or host material as the emitter panel. The two component panels are attached together using an optical adhesive which has the same index of refraction as the plastic sheets, thus ensuring maximum transmission at their interface. No extra optical components are needed to achieve high coupling efficiency between the linear light source and visual output coupler.

Yet another purpose of the present invention is to provide a high efficiency visual display device which uses a commercially available green fluorescent lamp as a preferred light pumping source, and a red edge-emitting sheet for center-high-mounted stoplight applications.

Other purposes of the invention are to provide a visual display device which may be fabricated at low cost on a commercial production basis from readily available materials which is capable of providing a multi-color display, and has a substantially reduced profile achieved by relocating an illumination source from the front or rear of the device to an unobtrusive edge coupling location.

These and other features and advantages of the present invention will be apparent to those skilled in the art from the following detailed description of several preferred embodiments, taken together with the accompanying drawings, in which like reference numerals refer to like parts.

DETAILED DESCRIPTION OF THE INVENTION

Figure 1:
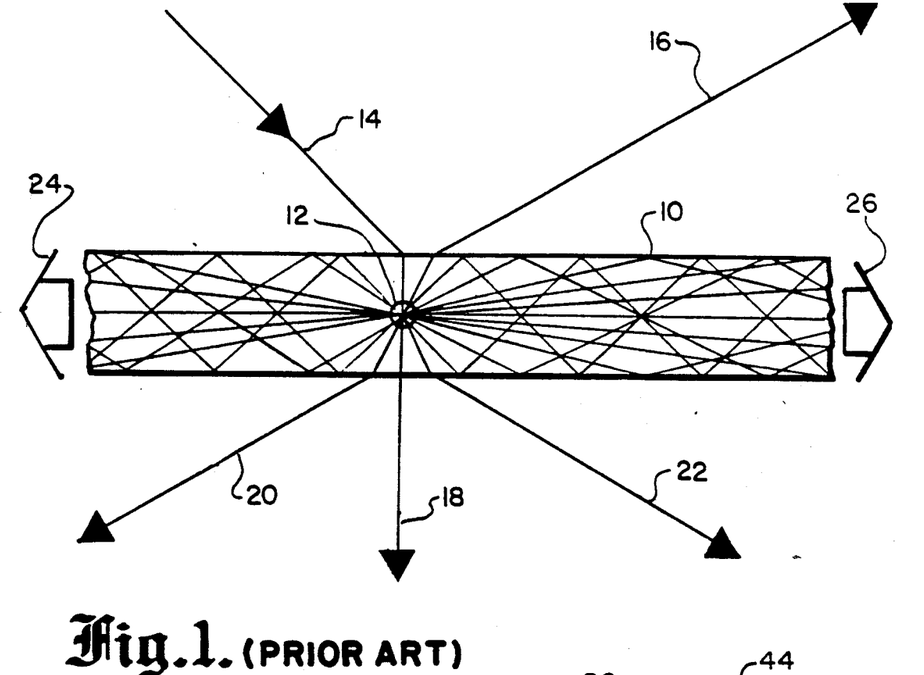
FIG. 1 is a diagram illustrating the optical properties of fluorescent dye-doped polymer films.

The present invention employs a fluorescent dye-doped polymer film or sheet to edge-couple light into a display panel. FIG. 1 of the drawings illustrates the properties of an acrylic or polycarbonate polymer plastic sheet or film with a fluorescent dye dispersed therein. The film is known in the art per se, and is commercially available. For example, Mobay Chemical Corporation markets such a film under the tradename "LISA-Plastics". The low-molecular weight stable polymer dyestuff, mixed into a transparent substrate or host medium, absorbs ambient light and emits it as longer wavelength visible light. The fluorescent dyes do not strongly reabsorb the longer wavelengths they emit, so more light is channeled to the edges. Light is collected over a large absorbing area and internally reflected back and forth between the internal surfaces until it can exit at an edge.

As viewed in FIG. 1, a light beam 14 is incident on a fluorescent dye molecule 12 in a transparent polymer edge-emitting film 10 at a random angle. A component of the light beam 14 symbolically designated as 16 is reflected from the surface of the film 10. Another component of the light beam 14 propagates through the film 10 as designated at 18. Still other components designated as 20 and 22 are refracted at various angles by the film 10 during propagation therethrough.

Due to the index of refraction of the film material, which is very large compared to that of air, and the absorption and emission properties of the fluorescent dye material, the majority of light incident on the film 10 from any angle is absorbed by the dye material and thereby trapped. Further, light emitted by the dye material through fluorescence impinges on the surfaces of the film 10 at an angle which exceeds the angle of total internal reflection of the material. The emitted light is therefore channeled toward the edges of the film 10 due to multiple reflections from the surfaces, as indicated at 24 and 26. The proportion R of light which is totally internally reflected is given by the expression:

$$R = 1 - [(n^2 - 1)/n]$$

where n is the index of refraction of the film 10. In practice, the index of refraction n of the film 10 is approximately 1.585 (for polycarbonate) and the proportion R of internally reflected light is on the order of 0.75, or 75%, with only 25% of the incident light being scattered out of the material.

Figure 2:
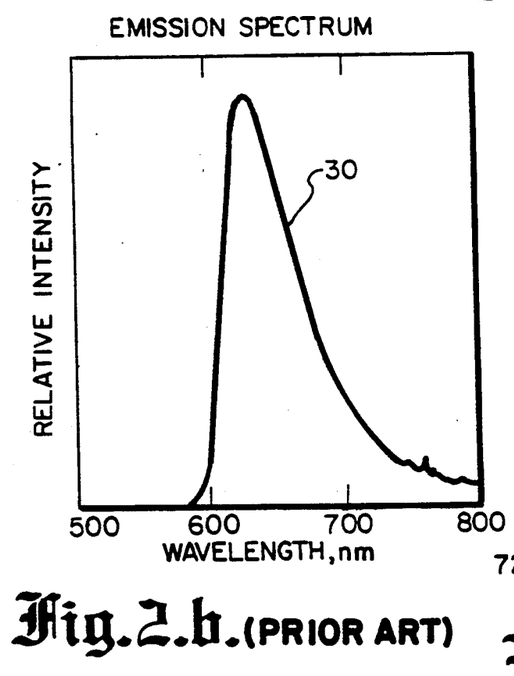
FIGS. 2a and 2b are graphs illustrating the absorption and emission spectral characteristics, respectively, of fluorescent dye-doped polymer films.

The spectral properties of the film 10 are illustrated in FIGS. 2a and 2b. FIG. 2a illustrates the absorption spectrum 28 of the material, which has a major peak at a wavelength of approximately 519 nm (visible green light). FIG. 2b illustrates the emission spectrum of the film 10 which has a major peak at a wavelength of approximately 630 nm (visible red light). Further illustrated in FIG. 2a is an emission spectrum 32 of a commercially available green fluorescent lamp (ZnSiO$_4$:Mn) which produces maximum output at almost the exact maximum absorption frequency of the film 10, thereby constituting an optimal light pumping source. It will be further noted that the emission peak of the film 10 in the visible red region of the spectrum makes it ideal as an illumination source for an automotive stop (brake) light.

Fluorescent dye-doped polymer films are discussed in a paper entitled "Fluorescence-activated liquid-crystal display", by G. Baur and W. Greubel, published in Applied Physics Letters, Vol. 31, No. 1, July 1, 1977, pp. 4–6. This paper describes a twisted nematic liquid crystal display with two polarizers and a fluorescent plate in the back. The fluorescent plate edges and special notches are coated with a reflector to eliminate any light escaping through the edges. The system described in the paper is only for backlighting a display and is not used for edge lighting. No reference is made to the use of fluorescent lighting for polymer dispersed liquid crystal displays (PDLC), holograms or center-high-mounted stoplight devices.

Another relevant reference is a paper entitled "Multicolor fluorescent display of scattering states in liquid crystal displays", by S. Sato and M. Labes, published in the Journal of Applied Physics, Volume 52, no. 6, June 1981, pp. 3941-3948. The authors describe the use of fluorescent dyes mixed with liquid crystal hosts in addition to the use of a second external fluorescent solution cell that is not regulated electrically but needed for the introduction of the second color. Operation is based on ultraviolet activation of the display at 350 nm and emission of a color in the visible region, with the color dependent on the electrical addressing of the cholesteric to nematic phase transition of the liquid crystal system. The fluorescent dyes were used only as an ultraviolet shutter and tunable fluorescence emitter.

A third reference which is believed to be especially relevant to fluorescent dye-doped polymer films is a paper entitled "Solar Energy Conversion with Fluorescent Collectors", by A. Goetzberger and W. Greubel, published in Journal of Applied Physics, Vol. 14, 1977, pp. 123-139. This paper describes the properties of fluorescent dye-doped polymer films for absorbing light over a large surface area, and channeling the internally emitted light out through an edge of the material to solar energy storage means. No applications other than the collection and storage of solar energy are addressed. The paper does, however, describe dyes having fluorescence efficiencies approaching 100%, which are of significant interest to the present application.

In one embodiment of the invention, a display panel illuminated by a fluorescent dye-doped polymer film is formed from a polymer dispersed liquid crystal (PDLC) film. In PDLC display films used for general electro-optic device applications, a liquid crystal (LC) material is dispersed as microdroplets in a polymer matrix and sandwiched between conductive electrodes. In general, these PDLC's can be formed by thermal or ultraviolet photoinitiated polymerization. The selected liquid crystal is added to a monomer/initiator to obtain a homogeneous, isotropic LC-monomer solution. The phase separation of the liquid crystal bubbles occurs as the monomer is submitted to thermal or photo-polymerization, which decreases the solubility of the LC components in the polymer. In these LC/polymer films most of the liquid crystal is evenly dispersed in small bubbles. The LC composition, concentration, and component solubilities all affect the phase separation, and in turn other physical parameters, such as the bubble size and bubble density in the PDLC film. The polymer films with bubbles are highly light scattering in the forward direction when there is a refractive index mismatch between the polymer matrix and the average index of the randomly aligned LC bubble orientation. When activated by an applied electric field across the PDLC, the films change from a light-scattering off-state to a transparent on-state if the ordinary refractive index ($n_o$) of highly birefringent positive dielectric anisotropy LC mixtures is matched with the refractive index of the polymer. There are several advantages associated with the fabrication and use of the LC/polymer system for displays in accordance with the present invention. The fabrication is simple and fast for large size displays. In addition, these types of devices operate with large light throughput (no polarizers), fast response times, and good contrast.

The present invention preferably employs an ultraviolet-polymerized system, using a commercially available monomer system, such as Norland optical cement. The commercial liquid crystal is preferably an eutectic mixture of cyanobiphenyl and cyanoterphenyl components. It has been determined that the polymerization conditions for the LC/monomer system composition determines the PDLC film properties by effecting the amount of LC separated as bubbles, and the size of the LC bubbles. PDLC systems are described, for example, in U.S. Pat. No. 4,688,900, issued Aug. 25, 1987 to J.W. Doane et al. and assigned to Kent State University, and U.S. Pat. No. 4,721,547, issued Mar. 1, 1988 to N.A. Vaz and assigned to General Motors Corporation.

The PDLC system utilized in accordance with the present invention comprises solutions of the liquid crystal BDH-E7 in Norland NOA-65 optical cement. Although a 50/50 mixture of these materials was the baseline mixture for the present PDLC material, the effects observed are not limited to this particular mixture or to this particular component system. Many other LC/monomer mixtures will produce the desired results.

Figure 3:
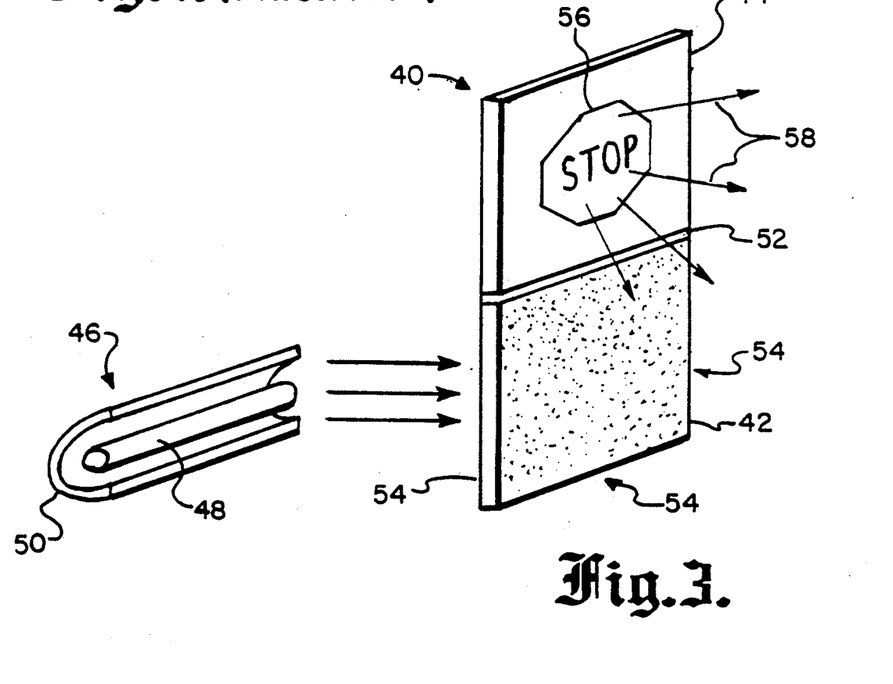
FIG. 3 is an elevational view of a generic embodiment of a visual display device in the form of an automotive center-high-mounted stop light, polymer dispersed liquid crystal (PDLC), or holographic or similar visual display device with a fluorescent dye-doped edge-illuminating emitter panel embodying the present invention.

Referring to FIG. 3, a visual display device embodying the present invention is generally designated by the reference numeral 40. It comprises a light emitter panel 42 and a light display panel 44. The light emitter panel 42 preferably comprises a fluorescent dye-doped polymer film or sheet of the type discussed in detail hereinabove. Although the emitter panel 42 is illustrated as being in the form of a flat plate or panel, it may be curved or formed into any other desired shape as desired for a particular application.

Further illustrated in the FIG. is a light source 46 which comprises a commercially available green fluorescent lamp 48 of the type discussed in detail hereinabove, and a mirrored reflector 50 for concentrating light emitted from the lamp 48 toward the surface of the emitter panel 42. Although not visible in the drawing, all edge surfaces 54 of the emitter panel 42 (except for the upper edge which is attached to the visual display panel 44 by an optical adhesive 52) are coated with an opaque or reflective material to prevent light propagating through the emitter panel 42 from exiting through the coated edges. Thus, the emitter panel 42 constitutes a linear edge-emitting light coupler which absorbs light emitted from the source 46 and emits light into the display panel 44 through the adjoining edges. Although an auxiliary light source 46 is illustrated in the Figure, it is within the scope of the invention to configure the visual display device 40 to operate just with ambient light. In such a case, all light incident on both the front and back surfaces of the emitter panel 42 will be absorbed by the panel 42, and emitted thereafter through edge coupling into the display panel 44. The intensity of the visual display produced by the panel 44 will be self-regulating, or more specifically, proportional to the intensity of ambient light incident on the emitter panel 42.

In a preferred embodiment of the present invention, the emitter panel 42 absorbs green light from the fluorescent light source 46 and emits light in the red region of the visible spectrum. This embodiment is ideally suited for a center-high-mounted stoplight application.

The visual display panel 44 is generically illustrated as being in the form of a panel or plate with an exemplary "STOP" pattern 56 formed thereon. In practice, the display panel 44 may be constituted by a polymer dispersed (PDLC) or other liquid crystal display, volume or other type of hologram, or a plastic sheet or plate with an appropriate pattern 56 formed on one surface thereof. However, the PDLC embodiment will not be transparent in the off-state. In the latter case, the pattern 56 may be formed by any means which constitutes a distortion on the surface of the panel 44 which changes the incident angle of the light propagating through the panel 44. When the incident angle is smaller than the total internal reflection angle, the light will be directed out the surface of the panel 44 as indicated by arrows 58.

Regardless of the particular configuration of the visual display panel 44, the optically transparent substrate or host material of the panel 44 is preferably selected to have substantially the same index of refraction as the material of the emitter panel 42 and the material of the optical adhesive 52 to ensure maximum internal reflection and linear coupling of light from the emitter panel 42 into the display panel 44, as well as maximum transmission of light through the edge coupling interface of the panels 42 and 44 and optical adhesive 52.

Although the visual display panel 44 is illustrated as being flat, it may be curved or formed into any desired shape to suit a particular application. It is understood that where the pattern 56 is formed on only one surface of the display panel 44, the panel 44 will be transparent in the absence of illumination incident on the emitter panel 42. Upon application of applied illumination from the source 46, the display panel 44 will emit visible red light through the areas of the pattern 56 only in the direction of the arrows 58, while remaining transparent in the opposite direction. Thus, the panel 44 may be adhered directly to a rear window of an automotive vehicle and be transparent to the vehicle operator under all conditions. The red stop display will be visible only to operators of vehicles approaching from the rear upon energization of the light source 46 in response to application of the vehicle brakes.

Figures 2, 4:
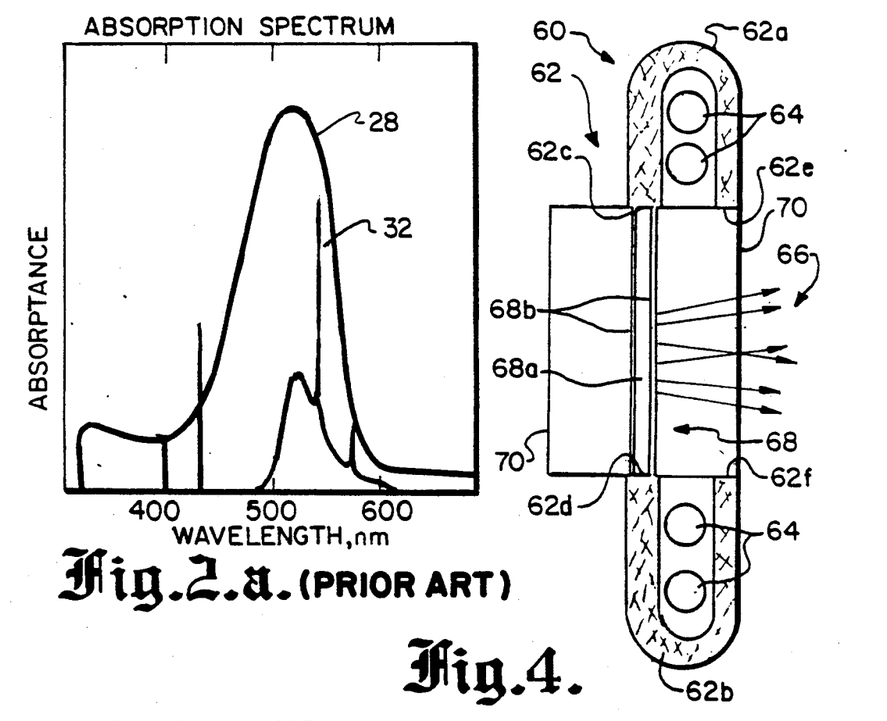
FIG. 4 is a sectional view of an embodiment of a visual display device in accordance with the present invention comprising a display panel in the form of a PDLC display.

FIG. 4 illustrates a visual display device 60 in accordance with the present invention which comprises an emitter panel 62 in the form of two U-shaped sections 62a and 62b. Each section 62a and 62b embraces one or more fluorescent lamps 64, whereby light emitted by the lamps 64 is incident on the inner surfaces of the respective sections 62a and 62b. All edges 62e and 62f of the emitter panel sections 62a and 62b except for linear light coupling edges 62c and 62d may be coated with an opaque or reflective material to prevent light propagating through the sections 62a and 62b from exiting the emitter panel 62 therethrough, although the scope of the present invention is not limited to such a requirement.

The visual display device 60 further comprises a display panel 66 which includes a polymer dispersed liquid crystal (PDLC) module 68. Although the detailed component elements of the module 68 are well known in the art and not illustrated in detail, the module 68 generally comprises a thin film 68a of PDLC. ITO (indium tin oxide) conductive films 68b are formed on the opposite surfaces of the PDLC 68a electrically active the module 68. The display panel 66 also has glass plates 70 which sandwich the module 68 for protective purposes.

The visual display device 60 may be operated in darkness with the illuminating light edge coupled into the upper and lower edges of the PDLC display panel 66, as illustrated. The device 60 may be operated in transmission or reflection mode with auxiliary illumination placed in front or in back of the display. In the latter case, the fluorescent dye-doped polymer film emitter panel 62 for edge-illuminating the display 66 increases the light output and contrast between the electric field activated on and off-states; this is equivalent to the contrast between the dark background and bright symbols of the display.

The PDLC films were known to be designed for optimum viewing and illumination both at 90° to the film surface, and at other angles. In the 90° position the electric field aligned LC ordinary index is matched to the polymer index, making the film highly transparent. Illumination at less or greater than a 90° angle decreases the index match and should reduce the contrast ratio. However, the higher contrast results obtained with edge lighting were not predictable, obvious or expected.

Major advantages resulting from edge lighting of a PDLC display in the present novel manner include higher brightness, better contrast, simple and high efficiency piping of light into the display, application for ambient light concentration, simple introduction of light into the display and space saving features in automotive displays at low cost. The measured absorbance of an ⅛ inch thick phosphor luminescent plastic sheet can potentially exceed 99.9% over the main part of the spectrum. Thus, the light power conversion efficiency of the total structure can have a value in excess of 50%.

Figure 5:
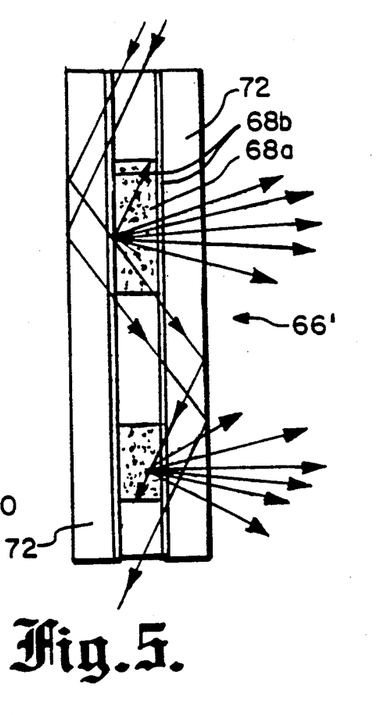
FIG. 5 is a sectional view of a modified PDLC display panel for use in the present invention.

A modification of the visual display panel 66 is illustrated in FIG. 5 and designated by the reference numeral 66'. The component parts of the panel 66' are essentially similar to those of the panel 66. However, the panel 66' further comprises fluorescent dye-doped polymer films 72 coated with conductive ITO films 68b. The films 72 in combination with the ITO films 68b form a refractive index discontinuity at any mismatched interface thereof, which causes ambient as well as edge-coupled light propagating therethrough to be scattered through the PDLC module 68. This mechanism is similar to that described in the reference to Baur and Greubel which was cited above, and enhances the brightness, contrast and efficiency of the visual display device.

Figure 6:
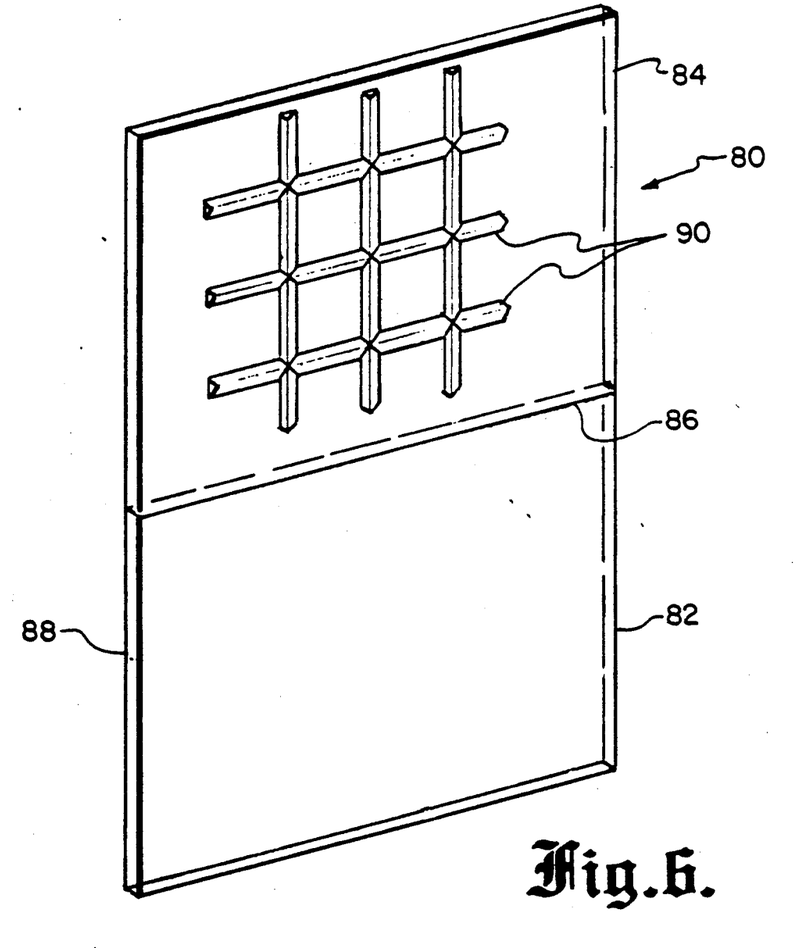
FIG. 6 is an elevational view of a visual display device in accordance with the present invention comprising a display panel having a pattern in the form of engraved grooves.

Referring now to FIG. 6, another visual display device embodying the present invention is generally designated by the reference numeral 80 and comprises an emitter panel 82 and a display panel 84. The emitter panel 82 is essentially similar to the generic embodiment described with reference to FIG. 3, and comprises a fluorescent dye-doped polymer film plate with a metallic coating 88 on edges thereof which are not used for linear edge-coupling of light into the display panel 84.

The display panel 84 comprises a plastic sheet or plate formed with a pattern formed on one surface thereof comprising thickness variations in the form of grooves 90. Although it is within the scope of the present invention to replace the grooves 90 with projections which serve the identical function of coupling light out the surface of the display panel 84, the grooves 90 may be easily formed by engraving or etching. As discussed hereinabove, any distortion or thickness variation on the surface of the panel 84 which causes light propagating therethrough to be incident on the distortion at an angle smaller than that of the angle of total internal reflection will cause the light to be reflected or scattered from the distortion out the face of the panel 84 on which the distortion is formed. Although the grooves 90 which constitute the visual light output pattern are illustrated as being formed on only one surface of the panel 84, the same or a different pattern may be formed on the opposite surface thereof providing the same or a different visual display depending on which surface of the display panel is viewed.

Figure 7:
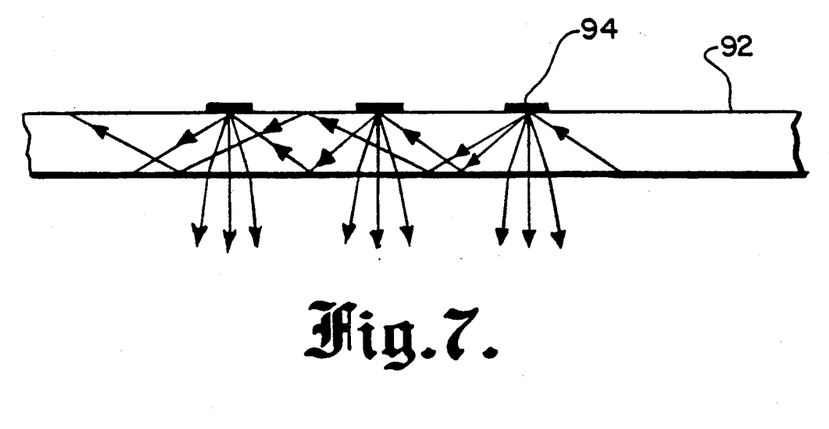
FIG. 7 is a fragmentary sectional view of a visual display device in acordance with the present invention comprising a display panel having a pattern formed by printed ink.

FIG. 7 illustrates another embodiment of the present invention in which a pattern 94 comprising printing is formed on a surface of a plastic display panel 92. The printing 94 comprises white or other colored ink which creates an index of refraction discontinuity at the interface of the ink with the surface of the panel 92 causing light propagating through the panel 92 to be reflected or scattered out the surface thereof opposite to the surface on which the printing 94 is applied. The printing 94 may alternatively comprise light reflecting or light dispersing ink, and may be applied to the surfaces of the grooves 90 in the embodiment of FIG. 6 if desired.

Figure 8:
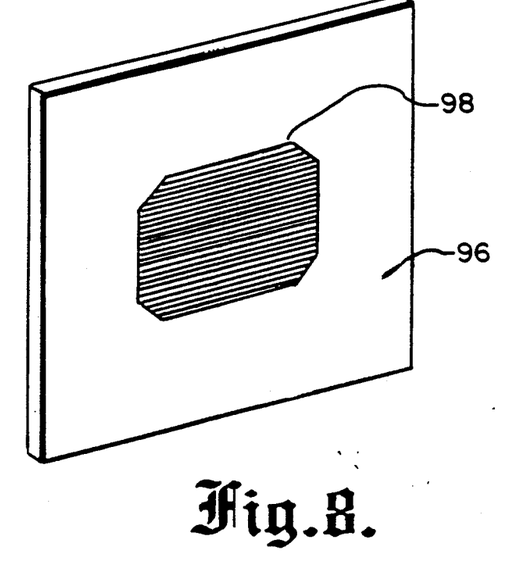
FIG. 8 is a fragmentary sectional view of a visual display device in accordance with the present invention comprising a display panel having a pattern formed as an optical diffraction grating.

FIG. 8 illustrates an alternative embodiment of the present invention in which the display pattern is in the form of a ruled optical diffraction grating 98 formed on a surface of a plastic display panel 96 for coupling light out the surface of the pattern. The grating 98 may be formed by photolithography, injection molding, machining, or any other applicable manufacturing process, and has a periodicity matched to the propagation direction and wavelength range of the output light. Further, the grating 98 may be constituted by a volume or other suitable holographic configuration.

As discussed hereinabove, an emitter panel which constitutes one of the components of the present invention need not be in the form of a flat rectangular plate. The emitter panel may be formed in any desired shape by injection molding or other applicable manufacturing process as illustrated in the examples of FIGS. 9 and 10.

Figure 9:
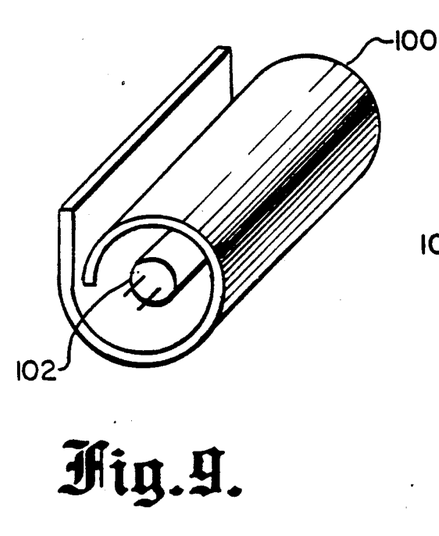
FIGS. 9 and 10 are elevational views of alternative embodiments of emitter panels in accordance with present invention.

In FIG. 9, an emitter panel 100 is formed in the shape of a spiral edge-emitting sheet, with a green fluorescent lamp 102 provided inside the spiral shape and extending coaxially therein.

Figure 10:
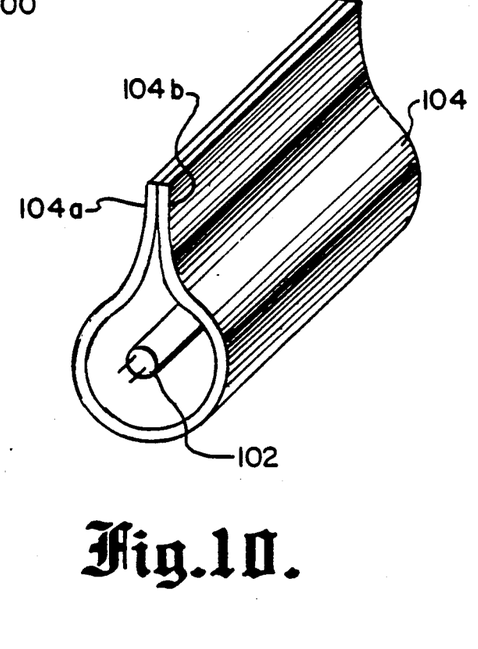

FIG. 10 illustrates an emitter panel 104 in the form of an edge-emitting sheet formed into a generally cylindrical shape with adjacent light coupling edge sections 104a and 104b extending radially outwardly from a center of the cylindrical shape. The overall configuration resembles a teardrop. The fluorescent lamp 102 is disposed coaxially inside the panel 104. The radius of curvature of the junctions between the main cylindrical portion of the panel 104 and the edge sections 104a and 104b is made as large as is practically possible in order to facilitate minimum loss propogation and total internal reflection of light throughout the entirety of the emitter panel 104. In both embodiments of FIGS. 9 and 10, the edges of the emitter panels which are not used for output light coupling are preferably coated with a light blocking reflective or opaque material.

In furtherance of the PDLC liquid crystal display embodiments described with reference to FIGS. 4 and 5, the display may be placed in a thick polymer frame, where light is introduced at 3 or 4 edges of the display, using commercially available polymer films, or a frame molded from dye doped pellets of this material. The electric field aligned clear area of the display does not affect the travel of light, or more specifically light introduced at the edge which is being internally reflected from the front and back of the glass surfaces, without being transmitted through the glass/ITO surfaces. If there is a light scattering medium in the light path, for example liquid crystal bubbles of the non-activated PDLC film, then the direction of the light path will be changed. If the angle at the surface is less than the angle of total reflection, then the light is refracted and will leave through the glass surface, as illustrated in FIG. 4.

A variation of the above technique is the use of a very thin large surface area polymer film within the display cell as a light collector and internal spacer film. Thin films of 3.6 mil may be molded from LISA pellets in a 150°C. pressurized cylinder at 1500 PSI.

The fluorescent dye doped polymer film can be ITO coated by sputtering, and used as a conductive substrate for PDLC fabrication as illustrated in FIG. 5. The light collected over the entire surface area of the polymer film will be redirected as fluorescent front face light at the scattering non-activated areas of the PDLC, where the total reflection is broken.

The above methods can all be used in the transmission mode and the reflection mode. For reflective displays one of the substrates would be replaced with a front surface mirror or any other reflective type electrode. Transmission mode display with an external transflector can be used as a see-through daylight display and a reflective night display.

EXAMPLE

A PDLC test cell was fabricated from a 1:1 mixture of Norland 65 monomer and BDH-E7 liquid crystal in an ITO coated test cell with a ½ mil Mylar spacer. The LC phase separation was completed after a 5 minute ultraviolet exposure of the sample in a 200 watt mercury lamp system. A 0.014×3.75×5.00 inch green LISA film was coupled to two edges of the test cell with optical cement. Electro-optical measurements were taken normal to the sample using a photodetector with two types of sample illumination:

1. Backlighting through Corning 4-64 filter.
2. Backlighting through Corning 4-64 filter + two fiber optic (OF) spot light illumination of the LISA plastic film.

The effect of illumination intensity on the on-state brightness and contrast ratio is summarized in the following TABLE.

The contrast ratio (CR) is defined as:

$$CR = (100 - T_{off})/(100 - T_{on})$$

TABLE

| FO INTENSITY mw/cm² FIBER OPTIC ILLUMINATION | % TRANSMISSION @ 70 VOLTS | | CONTRAST RATIO @ 70 VOLTS | |
|---|---|---|---|---|
| | OFF | ON | OFF | ON |
| 1.93 | 84.8 | 90.8 | 6.54 | 8.91 |
| 2.89 | 84.2 | 93.0 | 6.29 | 10.40 |
| 3.67 | 84.5 | 98.3 | 6.35 | 32.88 |

While several illustrative embodiments of the invention have been shown and described, numerous variations and alternate embodiments will occur to those skilled in the art without departing from the spirit and scope of the invention. For example, the single emitter panel which has been described and illustrated may be replaced by a plurality of emitter panels, each emitting light of a different color, to provide a multi-colored display device. Accordingly, it is intended that within the scope of the appended claims the invention may be practiced otherwise than as specifically described.

We claim:
1. A visual display device, comprising:
   display panel means formed with a display pattern on a surface thereof and having a light receiving edge and
   fluorescent dye doped emitter panel means for absorbing light incident upon a surface thereof and emitting light through an edge thereof, said edges of said emitter and display panel means being optically coupled to each other for edge illumination of said display pattern, said emitter and display panel means each comprising light transmitting substrates.

2. A visual display device as in claim 1, in which said substrates of the emitter and display panels have a substantially equal index of refraction.

3. A visual display device as in claim 2, further comprising an optical adhesive for adhering said respective edges of the emitter and display panel means together, the optical adhesive and said substrates having an essentially similar index of refraction.

4. A visual display device as in claim 1, in which said substrates are optically transparent.

5. A visual display device as in claim 1, in which the fluorescent dye comprises a material which absorbs light at a first wavelength, and emits light at a second wavelength which is longer than the first wavelength.

6. A visual display device as in claim 1, in which the display pattern comprises grooves formed in said surface.

7. A visual display device as in claim 6, in which the display pattern further comprises ink applied in the grooves.

8. A visual display device as in claim 1, in which the display pattern comprises a hologram.

9. A visual display device as in claim 8, in which the hologram is a volume hologram.

10. A visual display device as in claim 1, in which the display pattern comprises an optical diffraction grating.

11. A visual display device as in claim 1, in which the display pattern comprises printing.

12. A visual display device as in claim 11, in which the printing comprises a pattern formed of ink.

13. A visual display device as in claim 12, in which the ink comprises a light reflecting material.

14. A visual display device as in claim 12, in which the ink further comprises a light diffusing material.

15. A visual display device as in claim 1, further comprising light source means for illuminating said surface of the emitter panel means.

16. A visual display device as in claim 15, in which the light source means comprises a fluorescent lamp.

17. A visual display device as in claim 15, in which the light source means comprises a fluorescent light emitting element and a reflector for reflecting light emitted by the light emitting element toward said surface of the emitter panel means.

18. A visual display device as in claim 15, in which the emitter panel means comprises an elongated sheet formed into a spiral shape, the light source means being disposed at substantially a center of the spiral shape.

19. A visual display device as in claim 15, in which the emitter panel means comprises a fluorescent dye doped sheet formed into a generally cylindrical shape with adjacent edges extending radially outwardly therefrom, the light source means being disposed at substantially a center of the cylindrical shape.

20. A visual display device as in claim 15, in which the emitter panel means comprises two U-shaped sections and two light sources embraced by the U-shaped sections respectively, each U-shaped section having a first edge which is optically coupled to the display panel means.

21. A visual display device as in claim 20, in which each U-shaped section has a second edge opposite the first edge provided with means for preventing light from propagating therethrough.

22. A visual display device as in claim 1, in which the display panel means is configured as an automotive center-high-mounted stop light.

23. A visual display device as in claim 1, in which the display panel means comprises a liquid crystal display.

24. A visual display device as in claim 1, in which the liquid crystal display comprises a polymer dispersed liquid crystal module.

25. A visual display device as in claim 24, in which the liquid crystal display further comprises a fluorescent dye material formed on at least one surface of the polymer dispersed liquid crystal module.

26. A stoplight device for an automotive vehicle, comprising:
fluorescent dye doped emitter panel means for absorbing light incident upon a surface thereof and emitting light through an edge thereof;
light source means for radiating light onto said surface of the emitter panel means in response to application of a vehicle brake; and
display panel means formed with a stoplight display pattern on a surface thereof and having an edge which is optically coupled to said edge of the emitter panel means for edge illumination of the display pattern.

27. A stoplight device as in claim 26, in which the emitter panel means and display panel means each comprise light transmitting substrates, the device further comprising an optical adhesive for adhering said respective edges of the emitter and display panels together, the optical adhesive having an index of refraction which is essentially similar to that of said substrates.

28. A stoplight device as in claim 27, in which said index of refraction is larger than the index of refraction of air, whereby a larger proportion of light propagating inside said substrates is reflected internally than is transmitted externally thereof.

29. A stoplight device as in claim 26, in which the fluorescent dye comprises a material which absorbs light at a first wavelength and emits light at a second wavelength which is longer than the first wavelength.

30. A stoplight device as in claim 26, in which the display pattern comprises grooves formed in said surface.

31. A stoplight device as in claim 30, in which the display pattern further comprises ink applied in the grooves.

32. A stoplight device as in claim 26, in which the display pattern comprises a hologram.

33. A stoplight device as in claim 32, in which the hologram comprises a volume hologram.

34. A stoplight device as in claim 26, in which the display pattern comprises an optical diffraction grating.

35. A stoplight device as in claim 26, in which the display pattern comprises printing.

36. A stoplight devices as in claim 35, in which printing comprises a pattern formed of ink.

37. A stoplight device as in claim 36, in which the ink comprises a light reflecting material.

38. A stoplight device as in claim 36, in which the ink comprises a light diffusing material.

39. A stoplight device as in claim 26, in which the light source means comprises a fluorescent lamp which emits light at a wavelength which is substantially equal to a maximum absorption wavelength of the fluorescent dye in the emitter panel means.

40. A liquid crystal display device, comprising:

fluorescent dye doped emitter panel means for absorbing light incident upon a surface thereof and emitting light through an edge thereof; and liquid crystal display panel means having a display pattern on a surface thereof and having an edge which is optically coupled to said edge of the emitter panel means for edge illumination of the display pattern.

41. A liquid crystal display device as in claim 40, in which the liquid crystal display panel means comprises a polymer dispersed liquid crystal module.

42. A liquid crystal display device as in claim 41, further comprising light source means for radiating light onto said surface of the emitter panel means.

43. A liquid crystal display device as in claim 40, in which the emitter panel means comprises a liquid crystal material and electrode means which sandwich the liquid crystal material therebetween to form a display pattern which is changeable between a transparent state and a light scattering state in response to an electric potential applied to the electrode means.

44. A liquid crystal display device as in claim 43, further comprising a fluorescent dye material formed on surfaces of the electrode means.

45. A liquid crystal display device as in claim 40, in which the emitter panel means and display panel means each comprise light transmitting substrates, the device further comprising an optical adhesive for adhering said respective edges of the emitter and display panels together of the optical adhesive having an index of refraction which is essentially similar to that of said substrates.

46. A liquid crystal display device as in claim 45, in which said index of refraction is larger than the index of refraction of air, whereby a larger proportion of light propagating inside said substrates is reflected internally than is transmitted externally thereof.

47. A liquid crystal display device as in claim 40, in which the fluorescent dye comprises a material which absorbs light at a first wavelength, and emits light at a second wavelength which is longer than the first wavelength.

48. A liquid crystal display device as in claim 40, in which the emitter panel means comprises two U-shaped sections and two light sources embraced by the U-shaped sections respectively, each U-shaped section having a first edge which is optically coupled to the display panel means.

* * * * *